(12) United States Patent  
Vaissiere et al.

(10) Patent No.: US 12,523,589 B2
(45) Date of Patent: Jan. 13, 2026

(54) METHOD OF MONITORING A CONDITION PREVAILING INSIDE A PIPING SYSTEM WITH RESPECT TO AN IMPAIRMENT DUE TO ACCRETION, ABRASION OR CORROSION

(71) Applicant: Endress+Hauser Group Services AG, Reinach (CH)

(72) Inventors: Dimitri Vaissiere, Rixheim (FR); Alfred Rieder, Landshut (DE); Stefan Pflüger, Munich (DE)

(73) Assignee: Endress+Hauser Group Services AG, Reinach (CH)

( * ) Notice: Subject to any disclaimer, the term of this patent is extended or adjusted under 35 U.S.C. 154(b) by 789 days.

(21) Appl. No.: 17/805,781

(22) Filed: Jun. 7, 2022

(65) Prior Publication Data
US 2022/0390344 A1 Dec. 8, 2022

(30) Foreign Application Priority Data

Jun. 7, 2021 (DE) .......................... 102021114584.8

(51) Int. Cl.
| | | |
|---|---|---|
| *G01N 11/16* | (2006.01) | |
| *G01F 23/80* | (2022.01) | |
| *G01N 9/00* | (2006.01) | |

(52) U.S. Cl.
CPC ............. *G01N 11/16* (2013.01); *G01F 23/80* (2022.01); *G01N 9/002* (2013.01)

(58) Field of Classification Search
CPC ........ G01N 11/16; G01N 9/002; G01N 17/00; G01N 27/02; G01F 23/80
See application file for complete search history.

(56) References Cited

U.S. PATENT DOCUMENTS

| 7,665,357 B2 | 2/2010 | Mueller et al. |
| 8,046,194 B2 | 10/2011 | Rufer et al. |

(Continued)

FOREIGN PATENT DOCUMENTS

| CN | 15255140 A | 9/2004 |
| CN | 103063688 A | 4/2013 |

(Continued)

OTHER PUBLICATIONS

Mironov, et al., Condition Monitoring of Operating Pipelines with Operational Modal Analysis Application, Transport and Telecommunication Institute, Transport and Telecommunication, 2015, vol. 16, No. 4, pp. 305-319.

(Continued)

*Primary Examiner* — Stephen D Meier
*Assistant Examiner* — Quang X Nguyen
(74) *Attorney, Agent, or Firm* — Brannon Sowers & Cracraft PC

(57) ABSTRACT

A method of monitoring a condition prevailing inside a piping system with respect to an impairment due to accretion, abrasion or corrosion caused by fluid(s) flowing through the piping system is disclosed, comprising the steps of: installing at least two measurement devices susceptible to an impairment and configured to measure variables indicative of the impairment; wherein the measured variables include at least two variables exhibiting a different dependency on the impairment; continuously recording data including time series of measured values of the variables measured; based on training data included in the data determining a dynamic reference behavior of the variables corresponding to time dependent distributions of values of the variables to be expected of the measured values when the measurement devices are unimpaired; repeatedly determining a deviation between a monitored behavior of the measured values of the variables and the reference behavior.

17 Claims, 4 Drawing Sheets

(56) References Cited

U.S. PATENT DOCUMENTS

| | | | |
|---|---|---|---|
| 2008/0163692 | A1 | 7/2008 | Huang et al. |
| 2013/0031973 | A1* | 2/2013 | Kirst .................... G01F 1/8409 |
| | | | 374/102 |
| 2014/0207862 | A1 | 7/2014 | Domke et al. |
| 2018/0306633 | A1 | 10/2018 | Bar-Cohen et al. |
| 2021/0190673 | A1* | 6/2021 | Vaissiere ............. G01N 29/036 |

FOREIGN PATENT DOCUMENTS

| | | |
|---|---|---|
| DE | 10356007 B3 | 7/2005 |
| DE | 102005050898 A1 | 5/2007 |
| DE | 102006030964 A1 | 1/2008 |
| DE | 102009002539 A1 | 10/2010 |
| DE | 102017102550 A1 | 8/2018 |
| DE | 102019124709 A1 | 3/2021 |
| DE | 102020111127 A1 | 10/2021 |
| KR | 101679520 B1 | 11/2016 |
| WO | 2007045539 A2 | 4/2007 |
| WO | 2012062551 A1 | 5/2012 |
| WO | 2014056709 A1 | 4/2014 |

OTHER PUBLICATIONS

Jong-Hoon, et al., SPAMMS: A sensor-based pipeline autonomous monitoring and maintenance system, Feb. 2010, Conference Paper (conference unidentified), Louisiana State University, 978-1-4244-5489-1/10, 2010 IEEE, 11 pp.

\* cited by examiner

METHOD OF MONITORING A CONDITION PREVAILING INSIDE A PIPING SYSTEM WITH RESPECT TO AN IMPAIRMENT DUE TO ACCRETION, ABRASION OR CORROSION

CROSS-REFERENCE TO RELATED APPLICATION

The present application is related to and claims the priority benefit of German Patent Application No. 10 2021 114 584.8, filed on Jun. 7, 2021, the entire contents of which are incorporated herein by reference.

TECHNICAL FIELD

The present disclosure concerns a method of monitoring a condition prevailing inside a piping system including at least one pipe with respect to an impairment due to accretion, abrasion or corrosion caused by one or more fluid(s) flowing through the piping system.

BACKGROUND

Piping systems are used in various types of industry, e.g. the food and beverage industry, the chemical industry and the oil- and gas industry, to transport fluids of various kinds, e.g. liquids or gases, from one location to another. As an example, they are e.g. applied in industrial plants or facilities performing production processes.

During operation of a piping system its inner surfaces are exposed to the fluid(s) flowing through the piping system. Due to this exposure an impairment of a condition prevailing inside the piping system may develop over time due to accretion, abrasion or corrosion. Accretion is caused by deposits of fluids having a tendency to adhere to surface(s) exposed to these fluid(s). An accretion layer forming inside a pipe reduces its inner diameter and thus increase the flow resistance. A continuously growing accretion layer may eventually cause a blockage of the pipe. As a countermeasure, pipes are e.g. cleaned at regular intervals. Abrasion is caused by abrasive fluids, e.g. fluids including sand or other abrasive particles. Corrosion is caused by corrosive fluids, e.g. salty or acidic liquids, corroding surfaces exposed to these fluids. Abrasion and corrosion reduce a wall thickness of pipes and thus reduce their mechanical stability. Thus, pipes exposed to corrosive or abrasive fluids should be replaced at regular intervals. Cleanings and replacements of pipes cause costs and usually require an interruption of a process performed on a site comprising the piping system.

Because a visual inspection of the condition prevailing inside the piping system is usually not possible during operation of the piping system the intervals between consecutive cleanings or replacements should be kept so short, that safe operation of the piping system is ensured. In consequence, they are quite often performed long before they are required due to the true condition of the piping system. Applying longer time intervals could however cause cleanings or replacements to be performed too late. This may have severe consequences regarding safety as well as operability of the piping system, which in turn could cause harm to people and/or the environment, high additional costs and/or extended downtimes of the piping system. Thus, there is a need in industry to monitor the condition prevailing inside the piping system during operation of the piping system, e.g. to optimize the time intervals in-between consecutive cleanings or replacements.

In many application, piping systems are equipped with measurement devices measuring physical and/or chemical properties of the fluid(s), and/or process parameters required to regulate and/or control a process performed at a site including the piping system. Many of these measurement devices are susceptible to impairments due to accretion, abrasion or corrosion, which in turn may have a negative effect on their measurement properties.

Examples include vibratory measurement devices, e.g. density measurement devices measuring a density of a fluid based on a resonance frequency of an oscillatory element immersed in the fluid and level switches monitoring whether a level of a fluid exceeds a predetermined level corresponding to a position of the level switch based on a change of the resonance frequency of the oscillatory element occurring when the vibrating oscillatory element is immersed in the fluid. An accretion layer depositing on the oscillatory element enhances the oscillating mass and thus reduces the frequency and corrosion or abrasion of the oscillatory element reduces the oscillating mass and thus increases the frequency. Thus, changes of the oscillating mass caused by accretion, corrosion or abrasion impair the measurement capabilities and/or monitoring capabilities of vibratory measurement devices.

This problem is addressed in U.S. Pat. No. 7,665,357 B2 describing a vibratory device designed to issue an accretion alarm, when the oscillation frequency of the oscillatory element falls below an adjustable limit determined based on dependencies of the oscillation frequency on process conditions and/or the process variable to be monitored and/or determined by the vibratory device. DE 10 2017 102 550 A1 describes a method of detecting corrosion or accretion of an oscillatory element based on its resonance frequency.

Another example are Coriolis measurement devices including a tube connected to or inserted in a pipe such that at least a fraction of the fluid(s) flowing through the piping system flows through the tube, and a drive system causing the tube to vibrate. Coriolis measurement devices are e.g. applied to measure a flow through the tube based on a phase difference of the vibration occurring near an inlet of the tube and the vibration occurring near an outlet of the tube during vibration of the tube. Further a density of the fluid can be measured based on the resonance frequency of the tube and a viscosity of the fluid can be determined based on the power required to vibrate the tube. Like in the previous example, changes of the oscillating mass of the tube caused by accretion, corrosion or abrasion of the tube impair the measurement capabilities of Coriolis measurement devices.

In this context, DE 10 2005 050 898 A1 describes a method of detecting accretion building up inside a straight tube of a Coriolis measurement device by at least temporarily exciting torsional vibrations of the straight tube and detecting accretion based on the frequency of the torsional vibrations. DE 10 2005 050 898 A1 further discloses using this method of accretion detection to monitor the condition prevailing inside a pipe connected to the tube of the Coriolis measurement device with respect to an impairment caused by accretion.

WO 2014/056709 A1 describes a system measuring a volume flow of a fluid flowing through a pipe. In one embodiment, the system includes two vibratory elements, e.g. a tube connected to the pipe such, that at least some of the fluid flows through the tube, and an oscillatory element immersed into the fluid. This system is operably in a self-diagnosis mode, wherein the system issues an alarm indicating an irreversible impairment of at least one of the two vibratory elements due to abrasion, corrosion, plastic deformation or cracking, when a difference between the resonance frequencies of the two vibratory elements exceeds a predetermined limit. Further, the system e.g. issues an alarm indicating an irreversible impairment of at least one of the two vibratory elements due to abrasion, corrosion, plastic deformation or cracking, when a deviation between an average power of drive signals causing the vibratory elements to vibrate exceeds a given limit.

U.S. Pat. No. 8,046,194 B2 describes a magnetic-inductive flow meter measuring a flow of a fluid based on a voltage induced between measuring electrodes by the fluid flowing through a measurement tube during application of a magnetic field. The flow meter is further configured to determine a conductivity of the fluid and/or a change of the surface of the measuring electrode based on an impedance measured between the measuring electrode and a reference electrode.

DE 10 2009 002 539 A1 describes a magnetic-inductive flow meter configured to measure an electric conductivity of the fluid flowing through its measurement tube, which can be applied to detect a conductive accretion layer forming inside the measurement tube.

Impairments of measurement devices resulting from accretion, corrosion or abrasion are due to their exposure to the fluid(s). In consequence, variables measured by measurement devices suitable for detecting the impairment are at least to some extent also affected by other influencing factors. These influencing factors e.g. include the density, the viscosity, the flow rate, the electrical conductivity and/or other properties of the fluid(s), a pressure and/or a temperature the measurement device is exposed to and/or other influencing factors, e.g. influencing factors associated with a dynamic process performed at the measurement site. Each of these influencing factors makes it more difficult to differentiate between changes of the variable caused by the impairment and changes of the variable caused by the other influencing factors. In consequence, the degree of impairment has to exceed a certain size before it can be detected based on the variable. With respect to influencing factors, that can be measured by the measurement device, some improvement can be attained by applying compensation methods. As an example, DE 10 2005 050 898 A1 mentioned above describes a method of compensating a dependency of the frequency of the torsional vibrations on the density and/or the viscosity of the fluid based on the density and/or the viscosity measured by the Coriolis measurement device during lateral vibrations of the straight tube. Nonetheless, there remains a fair number of influencing factors having an influence on the variable measured to detect the impairment, that cannot be eliminated, e.g. because the influencing factors are unknown and/or because measurements of the influencing factors are impossible or unavailable. In consequence, the influence of the influencing factors on the variable measured to detect the impairment reduces the capability of the detection method to detect small impairments and may also result in a fair number of false detections.

SUMMARY

Thus, it is an object of the present disclosure to provide a method of monitoring a condition prevailing inside a piping system during operation of the piping system exhibiting improved detection capabilities, with respect to detecting an impaired condition at an early stage, when the degree of impairment is small, and/or with respect to the reliability of the detections.

To this extent, the present disclosure includes a computer implemented method, of monitoring a condition prevailing inside a piping system including at least one pipe with respect to an impairment due to accretion, abrasion or corrosion caused by one or more fluid(s) flowing through the piping system; the method comprising the steps of:
  installing at least two measurement devices on the piping system; wherein each measurement device: is of a different type, is susceptible to an impairment corresponding to the impairment of the condition prevailing inside the piping system and is configured to measure one or more variables indicative of the impairment; and wherein the variables measured by the different measurement devices include at least two or at least three variables each exhibiting a different dependency on the impairment;
  during operation of the piping system continuously recording data including time series of measured values of the variables measured by the measurement devices and their time of measurement;
  based on training data included in the data determining a dynamic reference behavior of the variables corresponding to time dependent distributions of values of the variables to be expected of the measured values when the measurement devices are unimpaired;
  repeatedly determining a deviation between a monitored behavior corresponding to time dependent distributions of the measured values of the variables determined based on the data recorded during monitoring and the reference behavior; and
  based on the deviations at least once or repeatedly determining and providing a monitoring result by performing at least one of:
  a) detecting an impaired condition, when the deviations exceed a first deviation range and providing an output informing about the impaired condition, and
  b) determining a remaining time remaining until a degree of the impairment of the condition prevailing inside the piping system will exceed a predetermined limit by performing a time series prediction predicting a time remaining until the deviations will exceed a second deviation range corresponding to the predetermined limit and providing an output informing about the remaining time given by or corresponding to the time predicted by the time series prediction.

Monitoring the condition based on variables measured by different types of measurement devices provides the advantage, that each device is affected by corrosion, abrasion or accretion in a different way. The variables exhibiting different dependencies on the impairment provide the advantage, that a correspondingly wide range of effects of the impairment is covered, which in turn enables detecting the impairment based on each of these different effects.

The dynamic reference behavior provides the advantage, that it constitutes an application specific characterization of the unimpaired condition. The reference behavior not only reflects the values of the variables, but also their time dependencies and interdependencies between the individual variables to be expected during unimpaired operation of the piping system in view of all application specific influencing factors affecting the variables, in particular also in view of influencing factors associated with a dynamic process performed on or with the piping system. This very precise, application specific representation of the unimpaired condition enables for an impaired condition developing during monitoring to be detected at a very early stage. Further, by taking into account all application specific influencing factors affecting the variables, the time dependencies of the variables and their interdependencies provide the advantage, that the number of false detections is greatly reduced or even eliminated and that a high level of reliability of the monitoring result is attained.

A first refinement of the method concerns a method, wherein:
  a) the variables are stationary and the reference behavior includes the stationary behavior of the variables describing the linear or nonlinear time dependencies of the variables and fixed correlations between the interdependent variables; or
  b) the variables are stationary during specific identifiable phases, in particular phases identifiable and/or identified based on properties of the measured values characteristic of the specific phase and/or in particular phases given by time intervals during which the piping system is operated in a specific operation mode or during which a specific process step of a process performed on or with the piping system is performed, and the reference behavior the includes the stationary behavior of the variables describing the time dependencies of the variables and the correlations between the interdependent variables during these phases; and the monitoring behaviors are determined based on data sets included in the data that have been recorded during specific phases occurring during monitoring; or
  c) the variables are non-stationary variables describing a reproducible pattern during specific identifiable phases, in particular phases identifiable and/or identified based on properties of the measured values characteristic of the specific phase and/or in particular phases given by time intervals during which the piping system is operated in a specific operation mode or during which a specific process step of a process performed on or with the piping system is performed, and the reference behavior includes characteristics of the patterns described by the non-stationary variables and the correlations between the interdependent variables during these phases; and the monitoring behaviors are determined based on data sets included in the data that have been recorded during specific phases occurring during monitoring.

A second refinement of the method additionally comprises the steps of: for each variable based on the training data determining a time scale on which the respective variable changes; based on the time scales filtering the data such, that the filtered data only includes data recorded during time intervals during which the measured values of each of the variables changed in time according to the time scale determined for the respective variable; and performing the determination of the reference behavior and of each monitored behavior based on the filtered data.

A third refinement of the method comprises at least once or repeatedly performing the steps of:
  for at least two or each of the variables, based on the measured values of the respective variable included in the data recorded during monitoring or filtered data attained by filtering the data recorded during monitoring performing a time series prediction predicting a variable-specific remaining time remaining until the measured values of the respective variable will exceed a predetermined variable-specific range;
  determining the shortest one of the variable-specific remaining times as a minimum time remaining until the degree of impairment of the condition prevailing inside the piping will exceed the predetermined limit; and performing at least one of:
  providing an output informing about the minimum time, the variable for which the shortest one of the variable-specific remaining times was determined and/or the measurement device measuring the variable for which the shortest one of the variable-specific remaining times was determined;
  based on the minimum time performing a plausibility check of the remaining time determined based on the deviations; and
  issuing a warning when a difference between the remaining time and the minimum time exceeds a predetermined threshold.

A fourth refinement of the method additionally comprises the steps of:
  determining labeled training data including or consisting of data sets of the recorded data, that have been recorded during impaired time intervals, during each of which the measurement devices suffered from an impairment corresponding to a known or subsequently determined type of impairment of the condition prevailing inside the piping system; wherein the labeled training data includes labeled training data for at least two different types of impairments; and performing at least one of:
  a) based on the labeled training data for each of the different types of impairment determining criteria for determining whether the respective type of impairment is present based on the recorded data, at least once or repeatedly based on the criteria determining the presence of one of the at least two different types of impairment when the data recorded during monitoring fulfills the criteria determined for the respective type of impairment, and providing an output informing about the determined type of the impairment; and
  b) for each of the different types of impairments based on the labeled training data determining a type-specific direction in which the monitored behavior will deviate from the reference behavior when the respective type of impairment is present, wherein each type-specific direction is determined in form of a vector defined in a multidimensional coordinate system including a coordinate axis for each of the variables, for at least one of the monitored behaviors determined based on the recorded data or filtered data attained by filtering the recorded data determining a monitored direction in which the respective monitored behavior deviates from the reference behavior in the multidimensional coordinate system, based the monitored direction and the type-specific directions determining the type of impairment impairing the condition prevailing inside the piping system, and providing the thus determined type of impairment.

A fifth refinement of the method additionally comprises the steps of:
  performing at least one of:
  a) defining at least one impairment class, wherein each impairment class includes at least one type of impairment and is specified by a class variable given by the one of the variables measured that enables the earliest detection of impairments of the type(s) of impairment included in the respective impairment class; and
  b) determining at least one sub-class, wherein each sub-class includes at least one type of impairment and is specified by a class-variable given by the one of the variables that enables the earliest detection of impairments of the type(s) of impairment included in the respective sub-class and a reference manner for each one of a set of at least one sub-class variable, wherein each sub-class variable is given by one of the variables measured and is different from the class variable, and wherein each reference manner represents a manner in with the respective sub-class variable is affected by impairments of the type(s) of impairment included in the respective sub-class, in particular a manner given by the impairments causing the respective sub-class variable to increase, to decrease, to be above or below a reference value, or to be above or below a given threshold;

the method further comprising the steps of:

based on the data recorded during monitoring, determining which one of the variables measured enabled the earliest detection of an impairment developing inside the piping system, wherein the variable enabling the earliest detection is determinable as and/or given by the one of the variables measured, that first exceeds or drops below a variable specific threshold defined for the respective variable or is determinable as and/or given by one of the variables for which a time series prediction predicting a variable-specific remaining time remaining until the measured values of the respective variable will exceed a predetermined variable-specific range renders the shortest variable specific-remaining time; and performing at least one of:

a) determining this impairment to be an impairment included in the impairment class specified by the class variable, which is equal to the variable that enabled the earliest detection, and providing an output informing about this impairment class; and b) for each sub-class variable of at least one or each sub-class specified by the class-variable, that is equal to the variable that enabled the earliest detection, determining a manner in which the measured values of the sub-class variable have been affected by the impairment; determining the impairment to be an impairment belonging to a specific one of the sub-classes in case the manner in which the measured values of the sub-class variables of this specific sub-class are compliant to the corresponding reference manners and providing an output informing about the specific one of the sub-classes.

A refinement of the fifth refinement comprises the steps of:

performing at least one of:

a) predefining at least one impairment class based on the variables measured; and b) determining the at least one sub-class by: b1) based on the data recorded during monitoring, for at least some or each of the impairments occurring during monitoring determining which one of the variables measured by the measurement devices enabled the earliest detection of the respective impairment and determining the manner in which the measured values of the other variables have been affected by this impairment; and b2) based on the consecutively determined variables enabling the earliest detection and the corresponding manners in which the other variables have been affected determining at least one sub-class; and subsequently performing at least one of: a) applying the impairment class(es) and/or the sub-class(es) to classify detected impairments; and b) at least once or repeatedly following the determination, that a detected impairment is of a type of impairment included in one of the impairment classes and/or in one of the sub-classes performing the steps of: determining the type of impairment of the impairment prevailing inside the piping system; storing the determined type of impairment as a type of impairment included in the respective impairment class and/or in the respective sub-class; and subsequently indicating the type(s) of impairment included in the respective impairment class and/or in the respective sub-class each time when a detected impairment was determined to be of a type of impairment included in the respective impairment class and/or in the respective the sub-class.

According to a refinement of the method according to the fourth and/or the fifths refinement the different types of impairment include at least one of:

a type of impairment caused by accretion;

at least two different types of impairment caused by accretion, each specified by a specific type of accretion and/or specified by a predefined range for at least one property of an accretion layer formed by the accretion, the properties including at least one of: a thickness of the accretion layer, a stiffness of the accretion layer and a density of the accretion layer;

a type of impairment caused by corrosion or abrasion; and at least two different types of impairment caused by corrosion or abrasion and specified by a predefined range for a material removal caused by corrosion or abrasion.

A refinement of the method according to the fourth and/or the fifths refinement, wherein the impairment of the condition is due to accretion and the different types of impairment include at least two different types of impairment caused by accretion; comprises the steps of: based on the data recorded during monitoring repeatedly determining the type of the impairment; and scheduling and performing cleanings of the piping system based on a cleanability of accretion layers associated with the determined type of impairment.

According to a sixth refinement the variables measured by the measurement devices include least two of: a) at least one electrical variable, each given by, related to or determined based on at least one electrical property affected by corrosion, abrasion and/or accretion; b) at least one vibration variable, each given by, related to or determined based on at least one vibration property of a vibration of one of the pipes or a vibratory component of one of the measurement device exposed to the fluid(s); and c) at least one signal propagation variable, each given by, related to or determined based on at least one signal property of a signal received by the measurement device measuring the respective signal propagation variable along a signal propagation path extending along and/or through at least one surface area exposed to the fluid(s) affected by corrosion, abrasion or accretion occurring on the at least one surface area.

According to a seventh refinement the measurement devices include at least one or at least two of:

at least one vibratory device including a vibratory component exposed to the fluid(s), a drive configured to cause the vibratory component to vibrate in at least one predetermined vibration mode, at least one sensor sensing the resulting vibration and electronics configured to determine and to provide the measured values of at least one variable, each given by a vibration variable given by, related to or determined based on at least one vibration property of a vibration of the vibratory component; the vibration variable(s) including: a frequency, a resonance frequency, a vibration amplitude and/or a damping of the vibration of the vibratory component for at least one of the vibration modes and/or a stiffness of the vibratory component with respect to at least one of the vibration modes;

at least one measurement device or an accelerometer mounted on one of the pipes and measuring at least one variable given by a vibration variable given by, related to or determined based on at least one vibration property of vibrations of this pipe;

at least one measurement device configured to measure at least one variable given by an electrical variable given by, related to or determined based on at least one of: an electrical impedance, an electrical resistance, an electrical conductivity and at least one other electrical property of an electrical connection and/or an electrical component affected by corrosion, abrasion and/or accretion caused by the fluid(s); and at least one measurement device configured to measure at least one variable given by a signal propagation variable given by, related to or determined based on at least one signal property of a signal received by the respective measurement device along a signal propagation path extending along and/or through at least one surface area exposed to the fluid(s), wherein the at least one signal property includes at least one of: a signal attenuation, a signal amplitude, a signal reflection property, a property related to or determined based on an amplitude spectrum and/or a phase spectrum, a signal propagation time and at least one other signal property affected by corrosion, abrasion or accretion occurring on the at least one surface area.

According to a refinement of the seventh refinement:

a) the at least one vibratory measurement device includes at least one of:

a first measurement device, a level switch or a density measurement device, wherein the vibratory component is given by or includes an oscillatory element extending into one of the pipes; and a second measurement device, a Coriolis measurement device or a Coriolis measurement device measuring at least one of: a flow, a density and a viscosity of the fluid(s); wherein the vibratory component is given by or includes a tube connected to or inserted in one of the pipes such, that at least a fraction of the fluid(s) flowing through the piping system flows through the tube;

b) the at least one measurement device configured to measure at least one variable given by an electrical variable include at least on of:

a measurement device or a conductivity sensor including two electrodes extending into the pipe and electronics connected to the electrodes and configured to determine and to provide the measured values of the at least one electrical variable measured by this measurement device; and a measurement device given by a magnetic inductive flow meter including a tube connected to or inserted in one of the pipes such, that at least a fraction of the fluid(s) flowing through the piping system flows through the tube, a set of two or more electrodes galvanically coupled or directly exposed to the fluid(s) flowing through the tube and electronics connected to the electrodes and configured to determine and to provide the at least one electrical variable measured by the magnetic inductive flow meter; and/or c) the at least one measurement device configured to measure at least one variable given by a signal propagation variable include at least one of:

a measurement device given by an ultrasonic device, an ultrasonic flow meter, a clamp-on ultrasonic flow meter or an ultrasonic concentration meter;

a measurement device including an acoustic wave guide exposed to the fluid(s) flowing through the piping system, a transmitting interdigital transducers and a receiving interdigital transducer mounted space apart from each other on the acoustic wave guide, and electronics connected to the interdigital transducers and configured to determine and to provide the at least one signal propagation variable; and a measurement device given by a microwave device, a microwave flow meter or a microwave concentration meter.

An eight refinement of the method, wherein the impairment of the condition is due to accretion, comprises the steps of: at least once, repeatedly and/or based on the monitoring result performing a cleaning of the piping system; for at least one of the cleanings determining an effectiveness of the cleaning as or based on a difference between at least one of the deviations determined based on data recorded before the respective cleaning and at least one of the deviations determined based on data recorded after the respective cleaning; and performing at least one of: providing an output informing about the effectiveness of the cleaning, issuing a warning in case the cleaning was ineffective, and performing an additional cleaning or another remedy in case the cleaning was ineffective.

A ninth refinement of the method, wherein the impairment of the condition is due to accretion, comprises the steps of: at least once performing a cleaning of the piping system; and determining each remaining time to be determined after one of the cleanings solely based on deviations, that have been determined based on data recorded after the last cleaning.

According to a refinement of at least one of the eights and/or the ninth refinement each cleaning time interval during which the piping system is cleaned is: provided by a user of the method, by a super-ordinate unit or by a control system initiating and/or controlling the performance of the cleanings; or determined by a calculating unit that has been trained or learned to perform the determination of the cleaning time intervals and that performs each determination of the effectiveness and/or the remaining time based on the cleaning time intervals determined by the calculation unit based on the data.

An tenth refinement comprises at least one of the steps of:

a) determining a size of the deviations and determining and providing a degree of impairment of the condition prevailing inside the piping system given by or corresponding to the size of the deviations;

b) issuing an alarm when the deviations exceed a third deviation range;

c) providing an output informing about an unimpaired condition of the piping system when the deviations occur within the first deviation range; and d) based on the remaining time scheduling a service action and performing the service action before the end of the remaining time, wherein the service action either includes cleaning the piping system and/or at least one component included in or installed on the piping system that is exposed to the fluid(s), or includes servicing or replacing at least one pipe and/or at least one component included in or installed on the piping system that is exposed to the fluid(s).

The present disclosure further includes a monitoring system performing the method according to the present disclosure, the monitoring system comprising: the measurement devices; and a calculating unit directly or indirectly connected to or communication with each of the measurement devices; wherein the calculating unit is embodied to receive the data and to record the data by at least temporarily storing the data in a memory associated to the calculating unit; and wherein the calculating unit is embodied to determine the reference behavior to determine the deviations and to determine and to provide the monitoring result.

BRIEF DESCRIPTION OF THE DRAWINGS

The present disclosure and further advantages are explained in more detail using the figures of the drawing.

DETAILED DESCRIPTION

The present disclosure concerns a method, in particular a computer implemented method, of monitoring a condition prevailing inside a piping system with respect to an impairment that may develop over time due to accretion, abrasion or corrosion caused by one or more fluid(s) flowing through the piping system, as well as a monitoring system performing the monitoring method.

The piping system can be any piping system including at least one pipe 1 transporting the fluid(s). Examples are piping systems applied in the oil and gas industry for transporting oil, naphta or other liquids or gases, piping systems applied in the chemical industry for transporting chemicals, e.g. acids, piping systems applied for transporting other fluids, e.g. fluids including lime, paints or varnishes, as well as piping systems applied in the food and beverage industry, e.g. in food production or bottling plants. The pipe(s) 1 of the piping system e.g. include at least one metal pipe, at least one plastic pipe and/or at least one pipe 1 including an outer tube, e.g. a metal outer tube, and an inner liner.

Figure 1:
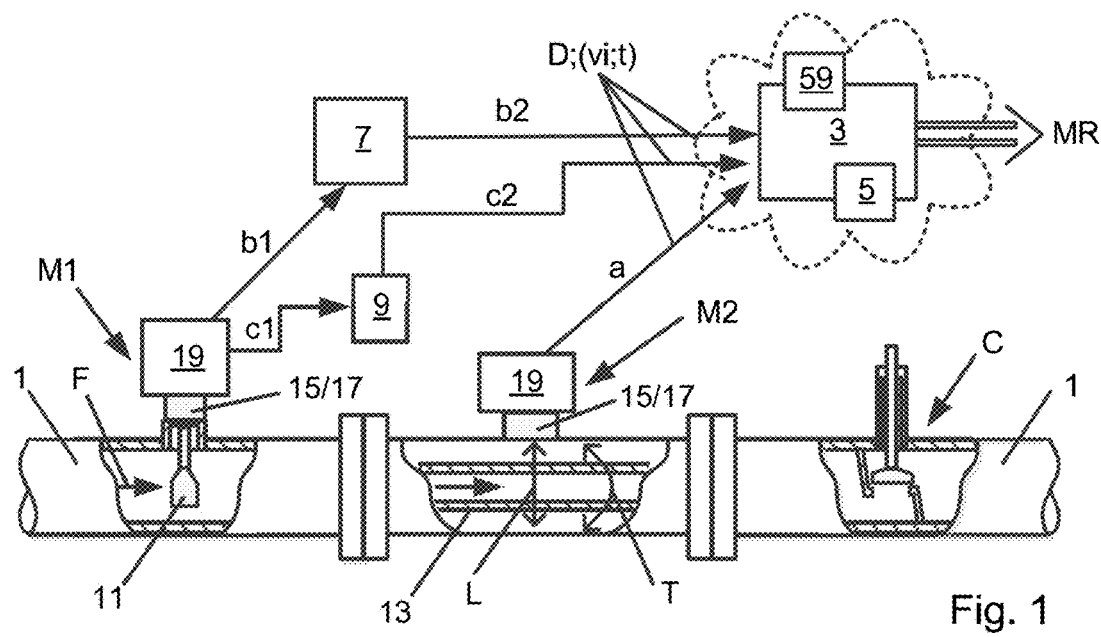
FIG. 1 shows a monitoring system including measurement devices installed on a piping system.

The method includes installing at least two measurement devices $M_i$ (i:=1, . . . , n; n≥2) on the piping system. Each measurement device $M_i$ is susceptible to an impairment corresponding to the impairment of the condition prevailing inside the piping system and is configured to measure one or more variables $V_i$ indicative of the impairment. The measurement devices $M_i$ are selected such, that each of the measurement devices $M_i$ is of a different type and that at least two of the variables $V_i$, preferably at least three of the variables $V_i$ measured by the different measurement devices $M_i$ each exhibit a different dependency on the impairment. An example of the monitoring system including two exemplary measurement devices M1, M2 installed on or connected to one of the pipes 1 the piping system is shown in FIG. 1. The measurement devices $M_i$ preferably include or consist of devices required on the piping system anyway, e.g. measurement devices measuring at least one measurand $m_i$, e.g. a physical property, an electrical property and/or a chemical property of the fluid(s), and/or a process parameter employed to monitor, regulate and/or control a process performed at a site including the piping system. In addition or as an alternative, the measurement devices $M_i$ may e.g. include at least one device installed solely for the purpose of monitoring the condition prevailing inside the piping system.

Figure 2:
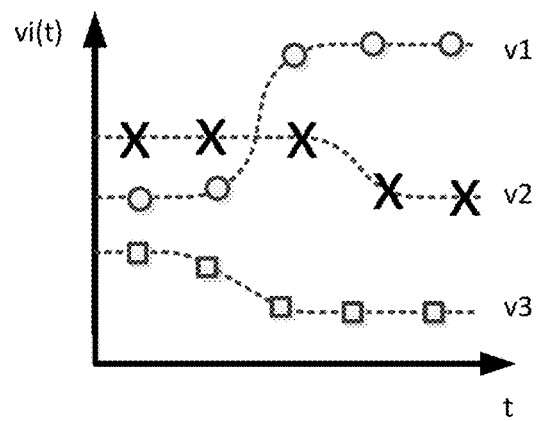
FIG. 2 shows time series of measured values of exemplary variables.

During operation of the piping system, the measurement devices $M_i$ measure the variables $V_i$ and data D including time series of measured values $v_i$ of the variables $V_i$ measured by the measurement devices $M_i$ and their time of measurement t is continuously recorded. Exemplary time series of measured values $v1$, $v2$, $v3$ of three different variables $V1$, $V2$, $V3$, are shown in FIG. 2.

Based on training data included in the data D that has been recorded during a training phase a dynamic reference behavior BR of the variables $V_i$ corresponding to time dependent distributions of values of the variables $V_i$ to be expected of the measured values $v_i$ when the measurement devices $M_i$ are unimpaired is determined. The training phase is e.g. a time interval following the installation of the measurement devices $M_i$, during which the condition prevailing inside the piping system is unimpaired and the newly installed measurement devices $M_i$ are unimpaired. The reference behavior BR is e.g. determined such, that it reflects the values and the time dependencies of the variables $V_i$ and their interdependencies to be expected during operation of the piping system. The reference behavior BR depends on the specific application, where the method is applied, in particular on the variables $V_i$ measured and the type of process performed on or with the piping system.

As a first example, in a specific application, wherein the variables $V_i$ are stationary, the reference behavior BR may e.g. include the stationary behavior of the variables $V_i$ describing the linear or nonlinear time dependencies of the variables $V_i$ and fixed correlations between the interdependent variables $V_i$. As a second example, in applications, where the variables $V_i$ were found to be stationary only during specific identifiable phases, e.g. time intervals during which the piping system is operated in a specific operation mode or during which a specific process step of the process performed on or with the piping system is performed, the reference behavior BR may e.g. include the stationary behavior of the variables $V_i$ describing the time dependencies of the variables $V_i$ and the correlations between the interdependent variables $V_i$ during these phases. As a third example, in some applications, the variables $V_i$ may be found to be non-stationary variables describing a reproducible pattern during specific identifiable phases, e.g. time intervals during which the piping system is operated in a specific operation mode or during which a specific process step of the process performed on or with the piping system is performed. In this case, the reference behavior BR may e.g. include characteristics of the patterns described by the non-stationary variables $V_i$ and the correlations between the interdependent variables $V_i$ during these phases. As an example, the characteristics can e.g. be described in form of a probability density function for the distribution of the time dependent values of the variables $V_i$. In the second and the third example, the occurrences of the respective specific phase are preferably determined based on the training data, e.g. by identifying them based on properties of the measured values $v_i$ characteristic of the specific phase, and the reference behavior BR is then determined as described above based on data sets of the training data that have each been recorded during one of the specific phases.

Following the determination of the reference behavior BR, the condition prevailing inside the piping system is monitored based the data D recorded during monitoring. To this extent, the method includes the step of repeatedly determining a deviation ΔB between a monitored behavior BM corresponding to time dependent distributions of the measured values vi of the variables Vi determined based on the data D recorded during monitoring and the reference behavior BR. Each monitored behavior BM is e.g. determined in the same form as the reference behavior BR and correspondingly reflects the sizes of the measured values vi, the time dependencies of the measured values vi and their interdependencies. In case the reference behavior BR was determined based on data sets of the training data recorded during the specific phases, the monitoring behaviors BM are determined based on data sets included in the data D that have been recorded during specific phases occurring during monitoring. Like the specific phases occurring during the training phase, the specific phases occurring during monitoring are preferably identified based on properties of the measured values vi characteristic of the specific phase.

Figure 3:
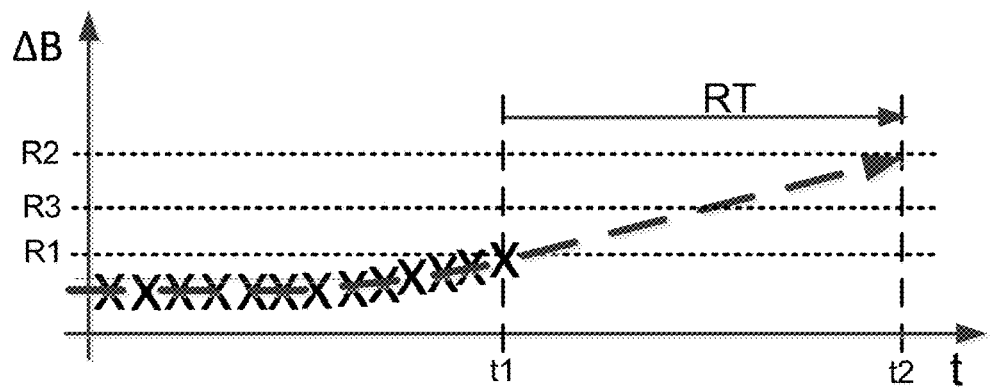
FIG. 3 shows consecutively determined deviations.

The method further includes the step of at least once or repeatedly determining and providing a monitoring result MR based on the previously determined deviations ΔB. To this extent, the method e.g. includes detecting an impaired condition prevailing inside the piping system, when the deviations ΔB exceed a first deviation range R1 and providing an output informing about the impaired condition. The first deviation range R1 is e.g. a deviation range determined based on statistical fluctuations and/or variations of the measured values vi applied to determine the reference behavior BR. In addition or as an alternative the method includes determining a remaining time RT remaining until a degree of the impairment of the condition prevailing inside the piping system will exceed a predetermined limit and providing an output informing about the remaining time RT. The remaining time RT is determined by performing a time series prediction predicting a time remaining until the deviations ΔB will exceed a second deviation range R2 corresponding to the predetermined limit and by determining the remaining time RT as a time given by or corresponding to the time predicted by the time series prediction. This is illustrated in FIG. 3 showing an example of consecutively determined deviations ΔB, wherein the deviations ΔB exceed the first deviation range R1 at a first time t1 and wherein the remaining time RT determined based on the deviations ΔB determined on or before the first time t1 ends at a second time t2 according to the time series prediction indicated by the dotted arrow.

As shown in FIG. 1, the monitoring system performing the monitoring method described above includes the measurement devices Mi installed on the piping system and a calculating unit 3. The calculating unit 3 is e.g. embodied as a unit comprising hardware, e.g. a computer or a computing system, located in the vicinity of the measurement devices Mi or at a remote location. As an alternative option cloud computing can be applied. Cloud computing denominates an approach, wherein IT-infrastructure, e.g. hardware, computing power, memory, network capacity and/or software are provided via a network, e.g. via the internet. In that case, the calculating unit 3 is embodied in the cloud.

The calculating unit 3 is embodied to receive the data D including the measured variables vi provided by the measurement devices Mi and their time of measurement t and to record the data D by at least temporarily storing the data D in a memory 5 associated to the calculating unit 3. To this extent, each measurement device Mi is connected to and/or communicating with the calculation unit 3 directly, as illustrated by the arrow a, via a super-ordinate unit 7, e.g. as illustrate by the arrows b1 and b2, and/or via an edge device 9 located in the vicinity of the measurement device Mi, e.g. as indicated by the arrows c1, c2. To this extent, hard wired or wireless connections and/or communication protocols known in the art, e.g. LAN, W-LAN, Fieldbus, Profibus, Hart, Bluetooth, Near Field Communication etc. can be applied. As an example, the measurement devices Mi, the edge device 9 and/or the super-ordinate 7 can be directly or indirectly connected to the calculating unit 3 via the internet, e.g. via a communication network, like e.g. TCP/IP.

The calculating unit 3 is embodied, e.g. programmed, to determine the reference behavior BR based on the data D recorded during the training phase, to subsequently monitor the condition prevailing inside the piping system as described above, to determine the deviations ΔB and to determine and to provide the monitoring result MR. As an example, the monitoring result MR is e.g. provided in form of an e-mail or a message automatically generated by the calculating unit 3 and dispatched to a predetermined recipient or a predetermined device, e.g. the super-ordinate unit 7, a computer or a mobile device, e.g. a cell phone, a tablet or a service tool.

The present disclosure provides the advantages mentioned above. As an option, individual steps of the method and/or components of the system can be implemented in different ways without deviating from the scope of the present disclosure. Several optional embodiments are described in more detail below.

As an example, determining and providing the monitoring result MR may e.g. include determining a size of the deviations ΔB and determining and providing a degree of impairment of the condition prevailing inside the piping system given by or corresponding to the size of the deviations ΔB. As another option, providing the monitoring result MR may include providing an output informing about the unimpaired condition of the piping system when the deviations ΔB occur within the first deviation range R1. As an additional or alternative option, an alarm may be issued when the deviations ΔB exceed a third deviation range R3. As shown in FIG. 3, the third deviation range R3 is e.g. an intermediate range larger than the first deviation range R1 and smaller than the second deviation range R2.

As an option, the reference behavior BR is e.g. be determined in form of a probability density function for the time dependent values of the variables Vi to be expected in absence of an impairment. In this case, the monitored behaviors BM are e.g. determined in form of the measured values vi and their time of measurement t, and the sizes of the deviations ΔB are e.g. determined as Mahalanobis distances between the measured values vi and the distribution described by the probability density function. In this case, the first, the second and/or the third deviation range R1, R2, R3 are e.g. each defined in form of a corresponding level of confidence for the monitored behavior BM to be compliant to the reference distribution described by the probability density function.

As an additional or alternative option, the method may additionally include based on the remaining time RT scheduling a service action and performing the service action before the end of the remaining time RT. Depending on the type of impairment the service action either includes cleaning the piping system and/or at least one component C included in or installed on the piping system, that is exposed to the fluid(s), or includes servicing or replacing at least one pipe 1 and/or at least one component C included in or installed on the piping system, that is exposed to the fluid(s). An exemplary component C, here given by a valve installed on the pipe 1 is shown in FIG. 1. Other examples of components C e.g. include a thermowell, a compensator, a sensor, a pump, an aggregate and/or at least one other device.

Cleaning of the piping system is preferably performed whilst the measurement devices Mi remain in place on the piping system. To this extent cleaning methods known under the name Cleaning-in-Place (CIP) can be applied. This has the advantage, that during each cleaning the measurement devices Mi are cleaned in the same way as the piping system. The same applies with respect to any component C that may be foreseen on the piping system and remains in place during the cleaning.

The exemplary measurement devices M1, M2 shown in FIG. 1 are given by two different types of vibratory devices. Each of them includes a vibratory component 11, 13 exposed to the fluid(s), a drive 15 configured to cause the vibratory component 11, 13 to vibrate in at least one predetermined vibration mode, at least one sensor 17 sensing the resulting vibration and electronics 19 configured to determine and to provide the measured values vi of the variable(s) Vi measured by the respective measurement device M1, M2.

The vibratory component 11 of the first measurement device M1 includes an oscillatory element, e.g. a rod or a tuning fork, extending into one of the pipes 1. When a tuning fork having two spaced apart rods attached to a diaphragm is applied, the vibration modes e.g. include a mode, wherein the rods perform antiphase vibrations in a direction perpendicular to their longitudinal axis. As an option, the first measurement device M1 is e.g. a level switch or a density measurement device.

The vibratory component 13 of the second measurement device M2 is or includes a tube connected to or inserted in one of the pipes 1 such, that at least a fraction of the fluid(s) flowing through the piping system as indicated by the arrow F flows through the tube. As an option, the second measurement device M2 is e.g. a Coriolis measurement device including one, two or even more tubes, e.g. at least one straight tube and/or at least one curved tube. The Coriolis measurement device is e.g. embodied to measure at least one measurand mi, e.g. a flow, a density and/or a viscosity of the fluid(s) flowing through its tube(s). In FIG. 1 the tube is straight and the vibration modes excited by the drive 15 interacting with the tube e.g. include a lateral mode L, wherein the tube performs lateral vibrations perpendicular to its longitudinal axis and/or a torsional mode T, wherein the tube performs torsional vibrations around its longitudinal axis.

Due to the exposure of their vibratory components 11, 13 to the fluid(s), each of the measurement devices M1, M2 is susceptible to an impairment corresponding to the condition prevailing inside the piping system caused by accretion, corrosion or abrasion of its vibratory component 11, 13. Regardless of whether the impairment is caused by accretion, corrosion or abrasion the impairment changes the vibrating mass and the vibration properties of the vibration of the respective vibratory component 11, 13. Correspondingly, the variables Vi measured by each of the two measurement devices M1, M2 include at least one vibration variable related to the vibration of its vibratory component 11, 13 indicative of the impairment of the respective measurement device M1, M2. The vibration variables e.g. include a frequency, a resonance frequency, a vibration amplitude and/or a damping of the vibration of the respective vibratory component 11, 13 for at least one of the vibration modes and/or a stiffness of the respective vibratory component 11, 13 with respect to at least one of the vibration modes. Examples of vibration variables and their measurement are e.g. described in U.S. Pat. No. 7,665,357 B2, DE 10 2017 102 550 A1, German patent application DE 102020111127.4 filed on Apr. 23, 2020, WO 2012/062551 A1, DE 10 2019 124 709 A1 and in WO 2007/045539 A.

The resonance frequencies measured by the first and the second measurement device M1, M2 are both inversely proportional to the vibrating mass, which increases in case of accretion and decreases in case of corrosion or abrasion. Further, the damping and the resonance frequencies are affected by a viscosity of the fluid(s), a density of the fluid(s), as well as by an accretion layer forming on the respective vibratory component 11,13. The stiffness of the respective vibratory component 11, 13 with respect to at least one of the vibration modes is reduced by corrosion or abrasion, and is increased by an accretion layer forming on the respective vibratory component 11, 13, in particular when the accretion layer hardens or solidifies on the vibratory component 11, 13. Thus, each of the vibration variables listed above exhibits a different dependency on an impairment due to accretion, corrosion or abrasion. In addition, for each one of the different vibration variables, the dependency of the respective vibration variable measured by the first measurement device M1 on the impairment is different from the dependency of the same vibration variable measured by the second measurement device M2 due to the different mass, the different shape and the different vibration modes of the two different vibratory components 11, 13. Thus, even in case the variables Vi measured by the different types of measurement devices Mi only include vibration variables, when different vibration variables provided by different types of vibratory devices are applied in combination and their interrelated time dependencies occurring during operation of the piping system are taken into account, they provide powerful means for detecting impairments at an early stage with a high level of reliability.

The capabilities of the monitoring system, as well as of the monitoring method may be further improved, by applying measurement devices Mi of different types such, that the variables Vi measured by the measurement devices Mi include at least two different types of variables. Examples of different types of variables include vibration variables, electrical variables and signal propagation variables.

Figure 4:
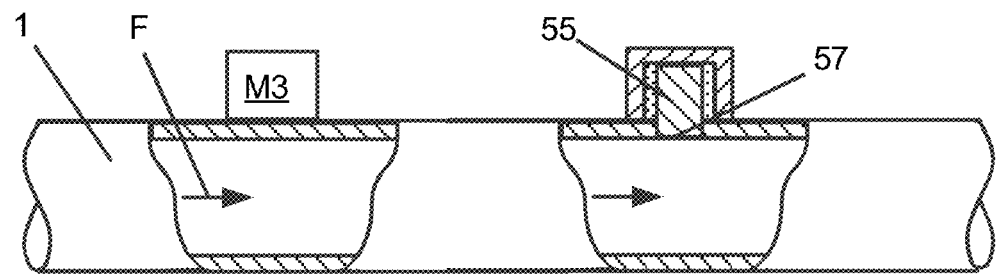
FIG. 4 to FIG. 9 each show an example of a measurement device.

Vibration variables are related to a vibration of an object exposed to the fluid(s) flowing through the piping system. Examples include the different types vibration variables measured by the vibratory devices shown in FIG. 1, where the objects are given by the respective vibratory component 11, 13. As another example the object may be given by one of the pipes 1. This is illustrated based on the measurement device M3 shown in FIG. 4 configured to measure and to provide at least one vibratory variable given by, related to or determined based on at least one vibration property of the vibration of the pipe 1 this measurement device M3 is mounted on. In FIG. 4 the measurement device M3 is e.g. an accelerometer. In this case, the variables Vi e.g. include a frequency and/or an amplitude of the vibrations of the pipe 1.

Electrical variables are given by, related to or determined based on at least one electrical property affected by the impairment. These variables e.g. include an electrical variable given by or related to an electrical impedance, an electrical resistance, an electrical conductivity and/or another electrical property of an electrical connection and/or an electrical component affected by corrosion, abrasion and/or accretion caused by the fluid(s). As an option, the electrical variables may include at least one secondary electrical variable determined based on two or more measured electrical variables. Examples of measurement devices Mi measuring at least one electrical variable are shown in FIGS. 5 and 6.

Figure 5:
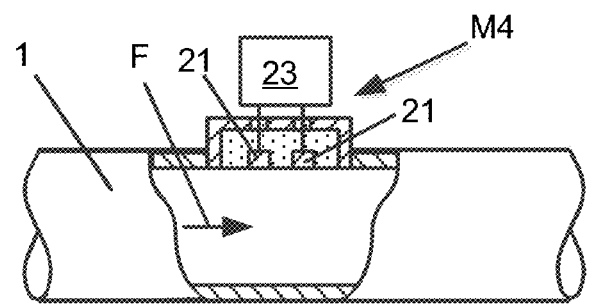

The measurement device M4 shown in FIG. 5 includes two electrodes 21 extending into the pipe 1 and electronics 23 connected to the electrodes 21. In this example, the electrical variables e.g. include an electrical impedance, an electrical resistance and/or an electrical conductivity measured by the electronics 23, e.g. by measuring a current flowing through the electrodes 21 while an alternating voltage is applied to the electrodes 21. As an example, the measurement device M4 is e.g. is a conductivity sensor measuring a measurand mi given by a conductivity of the fluid(s). As an alternative, conductivity sensors including more than two electrodes, e.g. three or four electrodes known in the art can be used.

Figure 6:
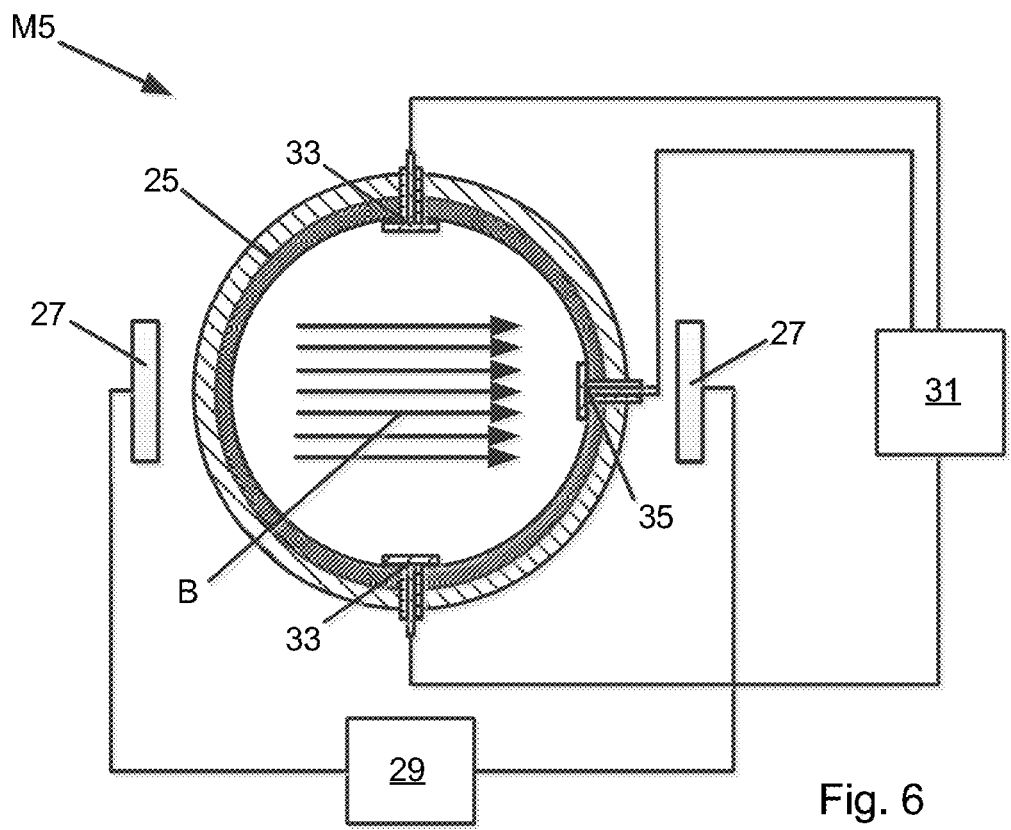

The measurement device M5 shown in FIG. 6 is a magnetic-inductive flow meter for measuring a measurand mi given by a flow of at least slightly conductive fluid(s). The flow meter is installed on the piping system such, that at least a fraction of the fluid(s) flowing through the piping system flows through a tube 25 of the measurement device M5 connected to or inserted in one of the pipes 1 of the piping system. The flow meter includes a generator generating a constant magnetic field B extending across the tube 25 in a direction perpendicular to a longitudinal axis of the tube 25. The generator e.g. includes a pair of coils 27 mounted diametrically opposite each other on opposite sides of the tube 25 and a current generator 29 providing a switched direct current of alternating polarity to the coils 27. The flow meter further includes a set of electrodes galvanically coupled or directly exposed to the fluid(s) flowing through the tube 25 and electronics 31 connected to the electrodes. The electrodes include two measuring electrodes 33 positioned diametrically opposite each other in a direction perpendicular to the magnetic field B on opposite sides of the tube 25. In certain embodiments, the electrodes may additionally include at least one reference electrode 35. The electronics 31 is configured to measure the flow based on a voltage induced between the measuring electrodes 33 in a direction perpendicular to the magnetic field B and perpendicular to the longitudinal axis of the tube 25.

The electronics 31 is further configured to measure and to provide at least one variable Vi given by an electric variable given by, related to or determined based on at least one electrical property affected by the impairment. The electrical variables e.g. include variables Vi given by or determined based on at least one of: a conductivity, an impedance, an electrical resistance or another type of electrical property measured between two of the electrodes, e.g. between the two measuring electrodes 33 or between one of the measuring electrodes 33 and the reference electrode 35. Examples of electrical variables are e.g. described in DE 103 56 007 B3, U.S. Pat. No. 8,046,194 B1 and in DE 10 2009 002 539 A1.

Signal propagation variables are given by, related to or determined based on at least one signal property of a signal, e.g. a microwave signal, an ultrasonic signal or an acoustic signal, received by the measurement device Mi measuring the respective variable Vi along a signal propagation path extending along and/or through at least one surface area exposed to the fluid(s) flowing through the piping system. The received signal is e.g. a signal including a signal component transmitted to a receiver of the measurement device Mi and/or a signal component reflected to the receiver. The signal properties e.g. include a signal attenuation, a signal amplitude, a signal reflection property, a property related to or determined based on an amplitude spectrum and/or a phase spectrum and/or a signal propagation time of the signals affected by corrosion, abrasion or accretion occurring on the surface area(s). Examples of measurement devices M6, M7, M8 configured to measure at least one variable Vi given by a signal propagation are shown in FIGS. 7, 8 and 9.

Figure 7:
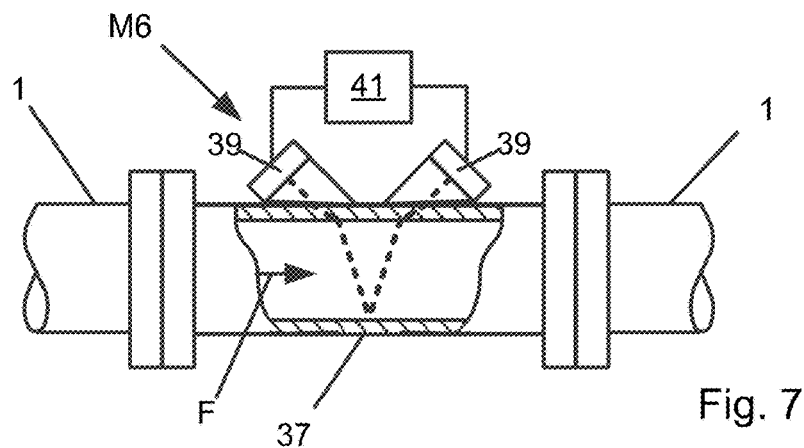

The measurement device M6 shown in FIG. 7 is an ultrasonic device including a tube 37 connected to or inserted in one of the pipes 1 such, that at least a fraction of the fluid(s) flowing through the piping system flows through the tube 37. As an alternative, it may be designed as a clamp-on device clamped onto the circumference of one of the pipes 1 serving as the tube. The ultrasonic device includes two transducers 39 and electronics 41 connected to the transducers 39. The electronics 41 is configured to measure and to provide a signal propagation variable affected by corrosion, abrasion or accretion of the tube 37, e.g. a signal propagation variable given by or determined based on at least one of: a signal amplitude, a signal attenuation and a signal propagation time of ultrasonic signals received by one of the transducers 39 along a signal propagation path extending along and/or through at least one surface area exposed to the fluid(s) flowing through the piping system. As an option, the measurement device M6 shown in FIG. 7 is e.g. an ultrasonic flow meter measuring a measurand mi given by a flow of the fluid(s) flowing through the pipe 1. In this case, the transducers 39 are mounted on an outside of the tube 37, one upstream of the other, and inclined towards each other by an angle with respect to the tube 37. Each transducer 39 alternately acts as a transmitter transmitting ultrasonic signals and as a receiver receiving ultrasonic signals transmitted towards it by the other transducer 39. In FIG. 7, the transducers 39 are located spaced apart from each other on the same side of the tube 37 such, that the ultrasonic signals transmitted by one of the transducers 39 travel to the other transducer 39 along the signal propagation path indicated by dotted lines in FIG. 7 extending through a tube wall section the transmitting transducer 39 is mounted on to an opposing tube wall reflecting the incident ultrasonic signals to the receiving transducer 39 through the interior of the tube 37 and a tube wall section the receiving transducer 39 is mounted on. As an alternative, the transducers 39 can be mounted on opposite sides of the measurement tube 37. Because the ultrasonic signals transmitted with and against the flow of the fluid(s) flowing through the tube 37 travel along the same propagation path, the differences between the upstream and downstream transit times of the ultrasonic signals are directly proportional to the flow velocity of the fluid(s). Thus, a volumetric flow is e.g. determined by the electronics 41 based on a product of a cross-sectional area of the measurement tube 37 and the flow velocity determined based on the differences of the transit times. As an option, other types of ultrasonic devices known in the art, e.g. ultrasonic concentration measurement devices can be modified to additionally measure and provide at least one of the signal propagation variables listed above in context with the ultrasonic flowmeter. An example of an ultrasonic concentration measurement device measuring the concentrations of components included in a gas flowing through its tube based on a measurement of the speed of sound in the gas and a temperature measurement is e.g. described in DE 10 2006 030 964 A1.

Figure 8:
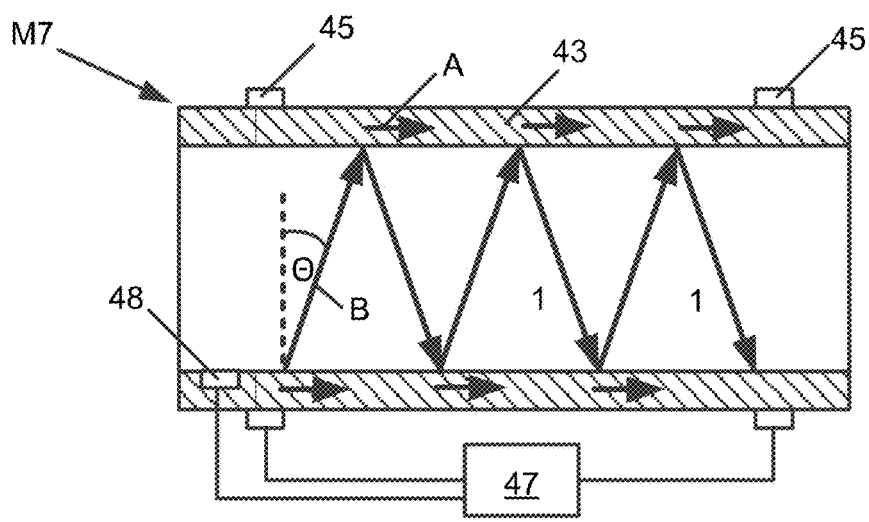
Figure 9:
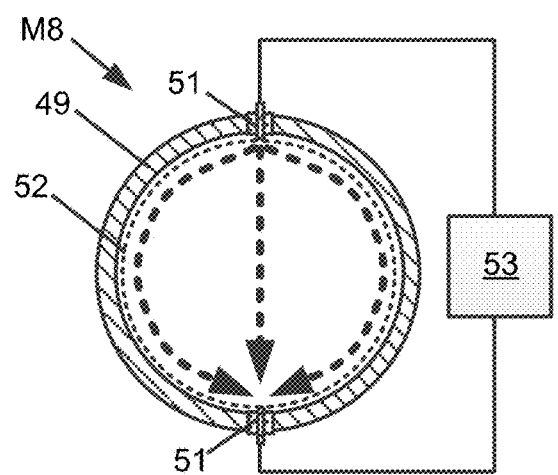

The measurement device M7 shown in FIG. 8 includes an acoustic wave guide 43 exposed to the fluid(s) flowing through the piping system. To this extent, the acoustic wave guide 43 is e.g. mounted onto one of the pipes 1 such, that is immersed in the fluid(s) flowing through the pipe 1 or connected to one of the pipes 1 such, that at least a fraction of the fluid(s) flowing through the piping system is flowing through the acoustic wave guide 43. Two interdigital transducers 45 are mounted spaced apart from each other on the outside of the acoustic wave guide 43. One of the interdigital transducers 45 is operated as a transmitter generating sound waves and the other one is operated as a receiver receiving incident sound waves. The transmitted sound waves propagate along the acoustic wave guide 43 as indicated by the arrows A on the basis of one or more wave modes. When the sound waves come into contact with the fluid located inside the acoustic wave guide 43, the waves disperse into the fluid. As indicated by the arrows B, this involves a mode conversion at a Rayleigh angle $\Theta$. The Rayleigh angle $\Theta$ depends on the speed of sound of the acoustic waves travelling along the wave guide wall and the speed of sound in the fluid. Thus, the signal propagation of the acoustic waves is affected by corrosion or abrasion of the acoustic wave guide 43, as well as by an accretion layer developing on the inside of the acoustic wave guide 43. Correspondingly, the measurement device M7 includes electronics 47 connected to the interdigital transducers 45 and configured to measure and to provide at least one signal propagation variable indicative of the impairment. These signal propagation variables e.g. include a signal propagation time and/or an amplitude attenuation for at least one of the wave modes. As an option, the measurement device M7 shown in FIG. 8 is e.g. configured to measure at least one measurand mi, e.g. an acoustic impedance, an acoustic density and/or the speed of sound in the fluid(s). Based on a temperature of the fluid(s) measured by a temperature sensor 48 installed on the acoustic wave guide 43, the acoustic impedance, the acoustic density, the speed of sound in the fluid(s) and reference data a concentration of a substance included the fluid can be determined. Measurement devices providing these measurands are sold by the Endress+Hauser Group under the product name "Teqwave". In the context of the present disclosure, these devices can be modified to additionally measure and provide the signal propagation variables listed above.

Other examples of measurement devices Mi, configured to measure signal propagation variables indicative of the impairment include microwave devices, e.g. microwave flow meters and microwave concentration meters. As an example, the measurement device M8 shown FIG. 9 is a microwave device including a tube 49 connected to or inserted in one of the pipes 1 such, that at least a fraction of the fluid(s) flowing through the piping system flows through the tube 49. The microwave device includes two antennas 51 located on opposite sides of the measurement tube 49 and electronics 53 connected to both antennas 51. This microwave device is e.g. embodied as a concentration measurement device measuring a concentration of dry matter included in the fluid(s) flowing through the tube 49 based on a signal propagation time and/or a signal attenuation of microwave signals propagating from the transmitting antenna 51 through the tube 49 to the receiving antenna 51. In certain embodiments, the measurement device M8 may include a dielectric liner 52 lining an inner surface of the tube 49. Like in the previous examples, the signal propagation of the microwave signals is not only affected by the properties of the fluid, but also by accretion, corrosion or abrasion of the tube 49 or the liner 52. Correspondingly, the electronics 53 of the measurement device M8 is configured to measure and to provide at least one signal propagation variable indicative of the impairment. In this respect, one of the antennas 51 is e.g. operated as a transmitting antenna and the signal propagation variables are e.g. determined based on the signal received by the other antenna 51. In addition or as an alternative, one of the antennas 51 is e.g. operated as a transmitting and as a receiving antenna receiving reflections of the transmitted signal. The signal propagation variables e.g. include a signal propagation time, an amplitude attenuation, a frequency at which the attenuation reaches an extremum, a property of an amplitude spectrum, and/or a phase difference between the transmitted and the received signal. Examples of signal propagation variables indicative of impairments caused by accretion are e.g. disclosed in the German patent application DE 102020133855.4 filed on Dec. 16, 2020 and in the German patent application DE 102020133858.9 filed on Dec. 16, 2020.

As mentioned above, some or all of the variables Vi measured by the measurement devices Mi may not only be affected by the impairment to be detected, but also by other influencing factors, e.g. properties of the fluid(s) and/or factors associated with a process performed on or with piping system. In this respect, as an option, the monitoring method may be further improved by filtering the recorded data D and by subsequently performing the determination of the reference behavior BR and the monitored behaviors BM, based on the filtered data FD. To this extent various different filtering methods may be applied. As an example, the filtering is e.g. performed based on the time scales on which the variables Vi measured by the measurement devices Mi change. In this case, the method includes for each variable Vi, based on the training data recorded during the training phase determining a time scale on which the respective variable Vi changes. These time scales are then applied to determine time intervals during which the measured values vi of each of the variables Vi measured during monitoring changed in time according to the time scale determined for the respective variable Vi. When this filtering method is applied, the filtered data FD only includes data D recorded during time intervals during which the measured values vi of each of the variables Vi change in time according to the time scale determined for the respective variable Vi. In this case, the calculation unit 3 is e.g. embodied to determine the time scales based on the data D recorded during the training phase, to subsequently determine the time intervals based on the data D recorded during monitoring and to filter this data D based on the previously determined time intervals.

As an additional or alternative option, the monitoring method may include the steps of at least once or repeatedly for at least two or each of the variables Vi determining a variable-specific remaining time RTvi, and of determining the shortest one of the variable-specific remaining times RTvi as a minimum time RTmin remaining until the degree of impairment of the condition prevailing inside the piping will exceed the predetermined limit. Here, each variable-specific remaining time RTvi is determined based on the measured values vi of the respective variable Vi included in the data D recorded during monitoring or in the corresponding filtered data FD by performing a time series prediction predicting the variable-specific remaining time RTvi remaining until the measured values vi of the respective variable Vi will exceed a predetermined variable-specific range. In this case, the monitoring result MR e.g. includes an output informing about the minimum time RTmin, the variable Vi for which the shortest one of the variable-specific remaining times RTvi was determined and/or the measurement device Mi measuring the variable Vi for which the shortest one of the variable-specific remaining times RTvi was determined. As an option, the minimum time RTmin is e.g. determined and provided as an additional safety measure and/or applied to perform a plausibility check. In the latter case, the calculating unit 3 is e.g. configured to determine the remaining time RT and the minimum time RTmin and to issue a warning, when a difference between the two exceeds a predetermined threshold.

Depending on the application different types of impairment may occur, e.g. a type of impairment caused by accretion or a type of impairment caused by corrosion or abrasion. Impairments caused by corrosion or abrasion can be subdivided into different types of impairment caused by corrosion or abrasion, wherein each of these different types is specified by a predefined range for a material removal caused by corrosion or abrasion. Impairments caused by accretion can be subdivided into different types of impairment, each given by a specific type of accretion. As an example, different types of accretion can e.g. be specified by a predefined range for at least one property of an accretion layer formed by the accretion. Examples for properties of the accretion layer include a thickness of the accretion layer, a stiffness of the accretion layer and a density of the accretion layer.

As option, the method disclosed may be further amended to include a method step of at least once or repeatedly determining the type of impairment impairing the condition prevailing inside the piping system and providing an output informing about the determined type of impairment.

Determination of the type of impairment is e.g. attained by the method including the step of determining labeled training data for at least two different types of impairments. The labeled training data is preferably determined based on the recorded data D and includes or consists of data sets of the recorded data D, that have been recorded during impaired time intervals, during each of which the measurement devices Mi suffered from an impairment corresponding to a known or subsequently determined type of impairment of the condition prevailing inside the piping system. The impaired time intervals are e.g. determined by at consecutive inspection times determining the type of impairment prevailing inside the piping system and subsequently identifying a time interval of a given length preceding the respective inspection time as one of the impaired time intervals, during which the type of impairment determined at the inspection time was present. In this case, the length of the time intervals preceding the inspection times is preferably significantly shorter than a time scale on which the degree of impairment increases. At the inspection times, the type of impairment is e.g. determined by examining the condition of one of the measurement devices Mi or the condition of an inspection probe 55 extending into the piping system, that can be more easily removed from the piping system to be examined. An example of an inspection probe 55 releasably mounted on one of the pipes 1 such, that a stern surface 57 of the inspection probe 55 is exposed to the fluid(s) flowing through the piping system is shown in FIG. 4.

The labeled training data determined for each of the different types of impairment is then e.g. applied to determine criteria for determining whether the respective type of impairment is present inside the piping system based on the recorded data D. The determination of the criteria is e.g. performed based on an analysis of the labeled training data, e.g. an analysis including a correlation analysis, a pattern recognition method, an autocorrelation analysis and/or another data analysis method capable of identifying characteristics of the measured values vi indicative of the respective type of impairment. Following this, the criteria are applied at least once to determine the type of impairment prevailing inside the piping system. In this case, the presence of one of the different types of impairment is determined, when the data D recorded during monitoring fulfills the criteria determined for the respective type of impairment.

Figure 10:
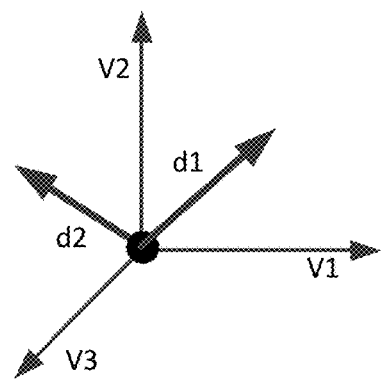
FIG. 10 shows type-specific directions of deviations of monitored behaviors.

As another option, the method may include for each of the different types of impairments based on the labeled training data determining a type-specific direction dj in which the monitored behavior BM will deviate from the reference behavior BR when the impaired condition is due to an impairment of the respective type. Each type-specific direction dj is determined in form of a vector pointing in the respective direction in a multidimensional coordinate system including a coordinate axis for each of the variables Vi. This is illustrated in FIG. 10 showing an example of two type-specific directions d1, d2 in a coordinate system spanned by three variables V1, V2, V3. In this embodiment, the method includes the step of for at least one of the monitored behaviors BM determined based on the recorded data D or the filtered data FD determining a monitored direction dm in which the respective monitored behavior BM deviates from the reference behavior BR in the multidimensional coordinate system. Following this, the type of impairment causing this deviation ΔB is determined based the monitored direction dm and the type-specific directions di. As an example, determination of the type of impairment is e.g. performed based on a degree of compliancy of the monitored direction dm to the type-specific directions di, e.g. by determining a projection of the monitored direction dm onto each of the type-specific directions di, and determining the type of impairment to be given by the type of impairment corresponding to the type-specific direction di rendering the longest projection.

The determination of the type of impairment is e.g. performed by the calculating unit 3 configured to perform at least one of the two determination method described above. In this case providing the monitoring result MR includes providing an output informing about the type of impairment that has been determined.

Figure 11:
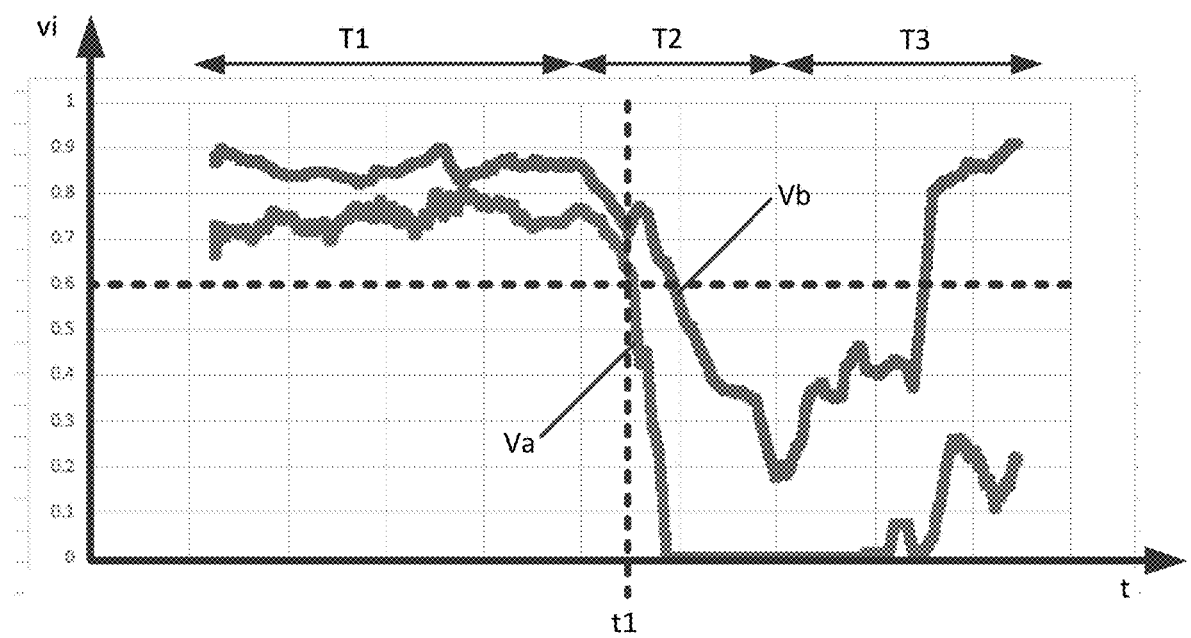
FIG. 11 shows measured values measured by two different measurement devices installed next to each other.

With respect to the determination of the type of impairment, applying measurement devices Mi measuring at least two different types of variables, e.g. vibration variables, electrical variables and/or signal propagation variables, provides the advantage, that it enable for a more precise differentiation between the different types of impairment. FIG. 11 shows measured values vi of an electrical variable Va measured by the magnetic inductive measurement device M5 shown in FIG. 6 and measured values vi of a signal propagation variable Vb measured by the microwave measurement device M8 installed next to the magnetic inductive measurement device M8 on the piping system, that have been recorded over a time period of several weeks, including a first time period T1 during which the condition prevailing inside the piping system was fairly stable, a second time period T2 during which an accretion layer increased inside the piping system, and a third time period T3, during which the properties of the accretion layer changed. The measured values vi shown are normalized such, that a value of 1 corresponds to the unimpaired condition. In the second time period T2 the electrical variable Va related to an electrical conductivity of the accretion layer decreased faster than the signal propagation variable Vb related to dielectric properties of the accretion layer. Thus, the electrical variable Va enabled the detection of accretion at an early stage, e.g. at the time t1 shown in FIG. 11, when the signal propagation variable Vb is not yet indicative of an impairment. In the third time period T3 the signal propagation variable Vb increased back up to the values measured during the first time period T1 and the electrical variable Va only increased to an intermediate value still indicative of accretion. The different manner in which the two variables are affected in the third time period T3 indicates, that the properties of the accretion layer and thus also the type of impairment has changed.

Even though the differentiation between different types of impairment is most effective, when the variables Vi include variables Vi of different types, it can also be performed when the variables Vi only include variables Vi of the same type, exhibiting different dependencies on the impairment. In either case, the method may e.g. include defining at least one impairment class. Each impairment class includes at least one type of impairment and is specified by a class variable Vk given by the one of the variables Vi measured, that enables the earliest detection of impairments of the type(s) of impairment included in the respective impairment class. This definition provides the advantage, that the impairment classes can be defined, even when no information on the type(s) of impairment included in the respective impairment class is available. The variable Vi enabling the earliest detection of an impairment is e.g. determinable as and/or given by the one of the variables Vi measured, that first exceeds or drops below a variable specific threshold defined for the respective variable Vi due to the impairment developing inside the piping system. In FIG. 11 the electric variable Va is the first one to drop below the normalized threshold value of 0.6. As an alternative option, the variable Vi enabling the earliest detection of an impairment is e.g. determinable as and/or given by the one of the variables Vi rendering the shortest variable specific-remaining time RTvi.

In addition or as an alternative, the method may include determining at least one sub-class including at least one type of impairment. Each sub-class is specified by the class-variable Vk given by the one of the variables Vi, that enables the earliest detection of impairments of the type(s) of impairment included in the respective sub-class and a reference manner for each one of a set of at least one sub-class variables Vn. Each sub-class variable Vn is given by one of the variables Vi measured and is different from the class variable Vk. Further, the reference manner determined for each of the sub-class variables Vn is determined such, that it represents the manner in with the respective sub-class variable Vn is affected by impairments of the type(s) of impairment included in the respective sub-class. As an example, each reference manner is e.g. given by impairments of the type(s) of impairment included in the respective sub-class causing the respective sub-class variable Vn to increase, to decrease, to be above or below a reference value and/or to be above or below a given threshold.

Next, a classification is e.g. performed by based on the data D recorded during monitoring, determining which one of the variables Vi measured enabled the earliest detection of an impairment developing inside the piping system. Following this, the impairment is e.g. determined to be an impairment belonging to the impairment class specified by the class variable Vk, which is equal to the previously determined specific one of the variables Vi that enabled the earliest detection. Further, an output informing about the thus determined impairment class is preferably provided. In addition or as an alternative, the classification may e.g. include: for each sub-class variable Vn of at least one or each sub-class specified by the class-variable Vk, that is equal to the variable Vi that enabled the earliest detection, determining a manner in which the measured values vn of the respective sub-class variable Vn have been affected by the impairment. Again, each manner is e.g. determined by determining whether the measured values vn increased, decreased, are above or below a reference value and/or are above or below a given threshold. In case the thus determined manners are compliant to the corresponding reference manners of a specific one of the sub-classes, the impairment is then determined to be an impairment of a type of impairment included in this specific one of the sub-classes. Further, an output informing about the thus determined specific one of the sub-classes is preferably provided.

As an option, the impairment classes, the type(s) of impairment included in each impairment class, the sub-classes and/or the type(s) of impairment included in each sub-class are e.g. determined based on labeled training data determined for at least two different types of impairments. As an alternative option, the definition of the impairment classes and the determination of the sub-classes can be performed without labeled training data and without prior knowledge about the type(s) of impairment that may occur in the specific application, where the method is applied. In this case, the impairment classes are e.g. predefined based on the variables Vi measured and the sub-classes are e.g. successively determined based on the data D recorded during monitoring. The latter is e.g. attained by for at least some or each of the impairments occurring during monitoring determining which one of the variables Vi measured by the measurement devices Mi enabled the earliest detection of the respective impairment and determining the manner in which the measured values vi of the other variables Vi have been affected by this impairment. Next, at least one sub-class is then determined based on the previously determined variables Vi enabling the earliest detection and the corresponding manners in which the other variables Vi have been affected. This determination of the sub-classes provides the advantage, that new sub-classes can be added when new types of impairment not included in one of the previously determined sub-classes occur during performance of the method.

The impairment class(es) and/or the sub-class(es) are e.g. applied to classify detected impairments accordingly. This is possible, even when no information on the type(s) of impairment included in the respective impairment class or sub-class is available. This information is preferably added as it comes available. To this extent, the method may include at least once or repeatedly following the determination, that a detected impairment belongs to one of the impairment classes and/or to one of the sub-classes determining the type of impairment prevailing inside the piping system, e.g. by examining the condition prevailing inside the piping system as described above in context with the determination of the training data. The thus determined type of impairment is then stored as a type of impairment included in the respective impairment class and/or in the respective sub-class. Subsequently the type(s) of impairment included in the respective impairment class and/or the respective sub-class are then indicated, each time when a detected impairment was determined to be of a type included in the respective impairment class and/or to the respective sub-class.

Determining the type of impairment is particularly useful with respect to different types of accretion. One of the reasons for this is, that it enables for changing properties of an accretion layer forming inside the piping system to be detected. Whereas soft accretion layers can be removed fairly easily by cleaning the piping system even when they have grown comparatively thick, an accretion layer hardening inside the piping system may be much more difficult to remove. Here, the repeated determination of the type of impairment caused by accretion, in particular with respect to types of impairments specified by the density and/or the stiffness of the accretion layer, provides valuable information, that is preferably applied to schedule the cleaning of the piping system accordingly. In this case, cleanings of the piping system are e.g. scheduled and performed based on a cleanability of accretion layers associated with the type of impairment that has been determined by the monitoring method.

In applications, where the piping system is cleaned repeatedly, e.g. regularly or based on the monitoring result MR provided by the monitoring method, the method may additionally include a method step of for at least one or each cleaning performed determining an effectiveness of the respective cleaning. In this case, providing the monitoring result MR e.g. includes providing an output informing about the effectiveness of the respective cleaning. As an additional or alternative option a warning is issued when the cleaning was determined to have been ineffective, and/or an additional cleaning or another remedy may be performed in case the cleaning was determined to have been ineffective. The effectiveness of the cleaning is e.g. determined as or based on a difference between at least one of the deviations $\Delta B$ determined based on data D recorded before the respective cleaning was performed and at least one of the deviations $\Delta B$ determined based on data D recorded after the respective cleaning. The cleaning times when the cleanings are performed can e.g. each be defined in form of a cleaning time interval $\Delta Tc$, starting at the beginning and ending at the end of the respective cleaning. Further, the calculating unit 3 is configured to perform the determination of the effectiveness based on the respective cleaning time interval $\Delta Tc$ and the deviations $\Delta B$ determined by the calculating unit 3 based on the data D recorded before and after the respective cleaning time interval $\Delta Tc$.

The cleaning time interval(s) $\Delta Tc$ is/are e.g. provided to the calculating unit 3 by the user of the method, e.g. via an interface 59 connected to or communicating with the calculating unit 3, or by the super-ordinate unit 7 or another control system initiating and/or controlling the performance of the cleanings connected to or communicating with the calculating unit 3. As an alternative option, the calculating unit 3 is e.g. trained or designed to learn the determination of the cleaning time intervals $\Delta Tc$ and to subsequently determine the cleaning time intervals $\Delta Tc$ itself based on the recorded data D. The training or learning of the determination of the cleaning time intervals $\Delta Tc$ is e.g. performed based on labeled training data recorded during cleaning time intervals $\Delta Tc$. As an example, the calculation unit 3 e.g. determines the cleaning time intervals $\Delta Tc$ based on the data D recorded during monitoring by identifying time intervals during which the measured values $v_i$ of all variables $V_i$ exhibit a time dependent distribution that is compliant to a time dependent distribution to be expected during cleaning time intervals $\Delta Tc$, that has been determined based on the labeled training data. As an alternative option, a method of unsupervised learning can be performed to learn the determination of the cleaning time intervals $\Delta Tc$. This is possible, because a cleaning is always associated with significant, sudden changes of the measured values $v_i$, which can be easily detected by unsupervised learning methods. In this case the thus determined learned method is subsequently applied to determine cleaning time intervals $\Delta Tc$ based on the recorded data D. Unsupervised learning provides the advantage, that it can be performed without labeled training data. This is particularly useful, when the piping system is very rarely cleaned.

In embodiments of the monitoring method including the determination of the remaining time RT, each remaining time RT determined after at least one cleaning has been performed, is preferably determined solely based on deviations $\Delta B$, that have been determined based on data D recorded after the last cleaning has been performed. In this respect, the determination of the cleaning time intervals $\Delta Tc$ performed by the calculating unit 3 provide the advantage, that this "reset" of the determination of the remaining time RT can be performed by the calculating unit 3 automatically without requiring any external input on the cleaning(s) performed.

The invention claimed is:

1. A computer implemented method of monitoring a condition prevailing inside a piping system including at least one pipe with respect to an impairment due to accretion, abrasion or corrosion caused by one or more fluid(s) flowing through the piping system; the method comprising the steps of:
   installing at least two measurement devices on the piping system; wherein each measurement device is of a different type, is susceptible to an impairment corresponding to the impairment of the condition prevailing inside the piping system and is configured to measure one or more variables indicative of the impairment; and wherein the variables measured by the different measurement devices include at least two variables each exhibiting a different dependency on the impairment;
   during operation of the piping system continuously recording data including time series of measured values of the variables measured by the measurement devices and their time of measurement;
   based on training data included in the data determining a dynamic reference behavior of the variables corresponding to time dependent distributions of values of the variables to be expected of the measured values when the measurement devices are unimpaired;
   repeatedly determining a deviation between a monitored behavior corresponding to time dependent distributions of the measured values of the variables determined based on the data recorded during monitoring and the reference behavior;
   based on the deviations at least once or repeatedly determining and providing a monitoring result by performing at least one of:
   a) detecting an impaired condition, when the deviations exceed a first deviation range and providing an output informing about the impaired condition, and
   b) determining a remaining time remaining until a degree of the impairment of the condition prevailing inside the piping system will exceed a predetermined limit by performing a time series prediction predicting a time remaining until the deviations will exceed a second deviation range corresponding to the predetermined limit and providing an output informing about the remaining time given by or corresponding to the time predicted by the time series prediction;
   at least once or repeatedly performing the steps of:
   for at least two or each of the variables based on the measured values of the respective variable included in the data recorded during monitoring or filtered data attained by filtering the data recorded during monitoring performing a time series prediction predicting a variable-specific remaining time remaining until the measured values of the respective variable will exceed a predetermined variable-specific range;

determining the shortest one of the variable-specific remaining times as a minimum time remaining until the degree of impairment of the condition prevailing inside the piping will exceed the predetermined limit; and performing at least one of:

providing an output informing about the minimum time, the variable for which the shortest one of the variable-specific remaining times was determined and/or the measurement device measuring the variable for which the shortest one of the variable-specific remaining times was determined;

based on the minimum time performing a plausibility check of the remaining time determined based on the deviations; and issuing a warning when a difference between the remaining time and the minimum time exceeds a predetermined threshold.

2. The method of claim 1, wherein:

the variables are stationary and the reference behavior includes the stationary behavior of the variables describing the linear or nonlinear time dependencies of the variables and fixed correlations between the interdependent variables; or the variables are stationary during specific identifiable phases and/or identified based on properties of the measured values characteristic of the specific phases given by time intervals during which the piping system is operated in a specific operation mode or during which a specific process step of a process performed on or with the piping system is performed, and the reference behavior includes the stationary behavior of the variables describing the time dependencies of the variables and the correlations between the interdependent variables during these phases; and the monitoring behaviors are determined based on data sets included in the data that have been recorded during specific phases occurring during monitoring; or the variables are non-stationary variables describing a reproducible pattern during specific identifiable phases based on properties of the measured values characteristic of the specific phase and/or in phases given by time intervals during which the piping system is operated in a specific operation mode or during which a specific process step of a process performed on or with the piping system is performed, and the reference behavior includes characteristics of the patterns described by the non-stationary variables and the correlations between the interdependent variables during these phases; and the monitoring behaviors are determined based on data sets included in the data that have been recorded during specific phases occurring during monitoring.

3. The method of claim 1, comprising the steps of:

for each variable based on the training data determining a time scale on which the respective variable changes;

based on the time scales filtering the data such, that the filtered data only includes data recorded during time intervals during which the measured values of each of the variables changed in time according to the time scale determined for the respective variable; and performing the determination of the reference behavior and of each monitored behavior based on the filtered data.

4. The method of claim 1, comprising the steps of:

determining labeled training data including or consisting of data sets of the recorded data, that have been recorded during impaired time intervals, during each of which the measurement devices suffered from an impairment corresponding to a known or subsequently determined type of impairment of the condition prevailing inside the piping system; wherein the labeled training data includes labeled training data for at least two different types of impairments; and performing at least one of:

a) based on the labeled training data for each of the different types of impairment determining criteria for determining whether the respective type of impairment is present based on the recorded data, at least once or repeatedly based on the criteria determining the presence of one of the at least two different types of impairment when the data recorded during monitoring fulfills the criteria determined for the respective type of impairment, and providing an output informing about the determined type of the impairment; and b) for each of the different types of impairment based on the labeled training data determining a type-specific direction in which the monitored behavior will deviate from the reference behavior when the respective type of impairment is present, wherein each type-specific direction is determined in form of a vector defined in a multidimensional coordinate system including a coordinate axis for each of the variables, for at least one of the monitored behaviors determined based on the recorded data or filtered data attained by filtering the recorded data determining a monitored direction in which the respective monitored behavior deviates from the reference behavior in the multidimensional coordinate system, based the monitored direction and the type-specific directions determining the type of impairment impairing the condition prevailing inside the piping system, and providing the thus determined type of impairment.

5. The method of claim 4, wherein the different types of impairment include at least one of:

a type of impairment caused by accretion;

at least two different types of impairment caused by accretion, each specified by a specific type of accretion and/or specified by a predefined range for at least one property of an accretion layer formed by the accretion, the properties including at least one of: a thickness of the accretion layer, a stiffness of the accretion layer and a density of the accretion layer;

a type of impairment caused by corrosion or abrasion; and at least two different types of impairment caused by corrosion or abrasion and specified by a predefined range for a material removal caused by corrosion or abrasion.

6. The method of claim 4, wherein the impairment of the condition is due to accretion and the different types of impairment include at least two different types of impairment caused by accretion; the method comprising the steps of:

based on the data recorded during monitoring repeatedly determining the type of the impairment; and scheduling and performing cleanings of the piping system based on a cleanability of accretion layers associated with the determined type of impairment.

7. The method of claim 1, additionally comprising the steps of:
performing at least one of:
defining at least one impairment class, wherein each impairment class includes at least one type of impairment and is specified by a class variable given by the one of the variables measured that enables the earliest detection of impairments of the type(s) of impairment included in the respective impairment class; and
determining at least one sub-class, wherein each sub-class includes at least one type of impairment and is specified by a class-variable given by the one of the variables that enables the earliest detection of impairments of the type(s) of impairment included in the respective sub-class and a reference manner for each one of a set of at least one sub-class variable, wherein each sub-class variable is given by one of the variables measured and is different from the class variable, and wherein each reference manner represents a manner in with the respective sub-class variable is affected by impairments of the type(s) of impairment included in the respective sub-class in a manner given by the impairments causing the respective sub-class variable to increase, to decrease, to be above or below a reference value, or to be above or below a given threshold;
the method further comprises the steps of:
based on the data recorded during monitoring, determining which one of the variables measured enabled the earliest detection of an impairment developing inside the piping system, wherein the variable enabling the earliest detection is determinable as and/or given by the one of the variables measured, that first exceeds or drops below a variable specific threshold defined for the respective variable or is determinable as and/or given by one of the variables for which a time series prediction predicting a variable-specific remaining time remaining until the measured values of the respective variable will exceed a predetermined variable-specific range renders the shortest variable specific-remaining time; and
performing at least one of:
determining this impairment to be an impairment included in the impairment class specified by the class variable, which is equal to the variable that enabled the earliest detection, and providing an output informing about this impairment class; and
for each sub-class variable of at least one or each sub-class specified by the class-variable, that is equal to the variable that enabled the earliest detection, determining a manner in which the measured values of the sub-class variable have been affected by the impairment; determining the impairment to be an impairment belonging to a specific one of the sub-classes in case the manner in which the measured values of the sub-class variables of this specific sub-class are compliant to the corresponding reference manners and providing an output informing about the specific one of the sub-classes.

8. The method of claim 7, comprising the steps of:
performing at least one of:
predefining at least one impairment class based on the variables measured; and
determining at least one of the sub-classes by: based on the data recorded during monitoring, for at least some or each of the impairments occurring during monitoring determining which one of the variables measured by the measurement devices enabled the earliest detection of the respective impairment and determining the manner in which the measured values of the other variables have been affected by this impairment; and based on the consecutively determined variables enabling the earliest detection and the corresponding manners in which the other variables have been affected determining at least one sub-class; and
subsequently performing at least one of: applying the impairment class(es) and/or the sub-class(es) to classify detected impairments; and at least once or repeatedly following the determination, that a detected impairment is of a type of impairment included in one of the impairment classes and/or in one of the sub-classes performing the steps of: determining the type of impairment of the impairment prevailing inside the piping system; storing the determined type of impairment as a type of impairment included in the respective impairment class and/or in the respective sub-class; and subsequently indicating the type(s) of impairment included in the respective impairment class and/or in the respective sub-class each time when a detected impairment was determined to be of a type of impairment included in the respective impairment class and/or in the respective the sub-class.

9. The method of claim 1, wherein the variables measured by the measurement devices include least two of:
at least one electrical variable, each given by, related to or determined based on at least one electrical property affected by corrosion, abrasion and/or accretion;
at least one vibration variable, each given by, related to or determined based on at least one vibration property of a vibration of one of the pipes or a vibratory component of one of the measurement device exposed to the fluid(s); and
at least one signal propagation variable, each given by, related to or determined based on at least one signal property of a signal received by the measurement device measuring the respective signal propagation variable along a signal propagation path extending along and/or through at least one surface area exposed to the fluid(s) affected by corrosion, abrasion or accretion occurring on the at least one surface area.

10. The method of claim 1, wherein the measurement devices include at least one or at least two of:
at least one vibratory device including a vibratory component exposed to the fluid(s), a drive configured to cause the vibratory component to vibrate in at least one predetermined vibration mode, at least one sensor sensing the resulting vibration and electronics configured to determine and to provide the measured values of at least one variable, each given by a vibration variable given by, related to or determined based on at least one vibration property of a vibration of the vibratory component; the vibration variable(s) including: a frequency, a resonance frequency, a vibration amplitude and/or a damping of the vibration of the vibratory component for at least one of the vibration modes and/or a stiffness of the vibratory component with respect to at least one of the vibration modes;
at least one measurement device or an accelerometer mounted on one of the pipes and measuring at least one variable given by a vibration variable given by, related to or determined based on at least one vibration property of vibrations of this pipe;
at least one measurement device configured to measure at least one variable given by an electrical variable given by, related to or determined based on at least one of: an electrical impedance, an electrical resistance, an electrical conductivity and at least one other electrical property of an electrical connection and/or an electrical component affected by corrosion, abrasion and/or accretion caused by the fluid(s); and at least one measurement device configured to measure at least one variable given by a signal propagation variable given by, related to or determined based on at least one signal property of a signal received by the respective measurement device along a signal propagation path extending along and/or through at least one surface area exposed to the fluid(s), wherein the at least one signal property includes at least one of: a signal attenuation, a signal amplitude, a signal reflection property, a property related to or determined based on an amplitude spectrum and/or a phase spectrum, a signal propagation time and at least one other signal property affected by corrosion, abrasion or accretion occurring on the at least one surface area.

11. The method of claim 10, wherein:

the at least one vibratory measurement device includes at least one of:

a first measurement device, a level switch or a density measurement device, wherein the vibratory component is given by or includes an oscillatory element extending into one of the pipes; and a second measurement device, a Coriolis measurement device or a Coriolis measurement device measuring at least one of: a flow, a density and a viscosity of the fluid(s); wherein the vibratory component is given by or includes a tube connected to or inserted in one of the pipes such, that at least a fraction of the fluid(s) flowing through the piping system flows through the tube;

the at least one measurement device configured to measure at least one variable given by an electrical variable include at least one of:

a measurement device or a conductivity sensor including two electrodes extending into the pipe and electronics connected to the electrodes and configured to determine and to provide the measured values of the at least one electrical variable measured by this measurement device; and a measurement device given by a magnetic inductive flow meter including a tube connected to or inserted in one of the pipes such, that at least a fraction of the fluid(s) flowing through the piping system flows through the tube, a set of two or more electrodes galvanically coupled or directly exposed to the fluid(s) flowing through the tube and electronics connected to the electrodes and configured to determine and to provide the at least one electrical variable measured by the magnetic inductive flow meter; and/or the at least one measurement device configured to measure at least one variable given by a signal propagation variable include at least one of:

a measurement device given by an ultrasonic device, an ultrasonic flow meter, a clamp-on ultrasonic flow meter or an ultrasonic concentration meter;

a measurement device including an acoustic wave guide exposed to the fluid(s) flowing through the piping system, a transmitting interdigital transducers and a receiving interdigital transducer mounted space apart from each other on the acoustic wave guide, and electronics connected to the interdigital transducers and configured to determine and to provide the at least one signal propagation variable; and a measurement device given by a microwave device, a microwave flow meter or a microwave concentration meter.

12. The method of claim 1, wherein the impairment of the condition is due to accretion, the method comprising the steps of:

at least once, repeatedly and/or based on the monitoring result performing a cleaning of the piping system;

for at least one of the cleanings determining an effectiveness of the cleaning as or based on a difference between at least one of the deviations determined based on data recorded before the respective cleaning and at least one of the deviations determined based on data recorded after the respective cleaning; and performing at least one of: providing an output informing about the effectiveness of the cleaning, issuing a warning in case the cleaning was ineffective, and performing an additional cleaning or another remedy in case the cleaning was ineffective.

13. The method of claim 1, wherein the impairment of the condition is due to accretion, the method comprising the steps of: at least once performing a cleaning of the piping system; and determining each remaining time to be determined after one of the cleanings solely based on deviations, that have been determined based on data recorded after the last cleaning.

14. The method of claim 1, wherein each cleaning time interval during which the piping system is cleaned is:

provided by a user of the method, by a super-ordinate unit or by a control system initiating and/or controlling the performance of the cleanings; or determined by a calculating unit that has been trained or learned to perform the determination of the cleaning time intervals and that performs each determination of the effectiveness and/or the remaining time based on the cleaning time intervals determined by the calculation unit based on the data.

15. The method of claim 1, comprising at least one of the steps of:

a) determining a size of the deviations and determining and providing a degree of impairment of the condition prevailing inside the piping system given by or corresponding to the size of the deviations;

b) issuing an alarm when the deviations exceed a third deviation range;

c) providing an output informing about an unimpaired condition of the piping system when the deviations occur within the first deviation range; and d) based on the remaining time scheduling a service action and performing the service action before the end of the remaining time, wherein the service action either includes cleaning the piping system and/or at least one component included in or installed on the piping system that is exposed to the fluid(s), or includes servicing or replacing at least one pipe and/or at least one component included in or installed on the piping system that is exposed to the fluid(s).

16. A monitoring system performing the method steps of claim 1 and including:

the measurement devices; and a calculating unit directly or indirectly connected to or communication with each of the measurement devices;

wherein the calculating unit is embodied to receive the data and to record the data by at least temporarily storing the data in a memory associated to the calculating unit; and wherein the calculating unit is embodied to determine the reference behavior,
to determine the deviations and to determine and to provide the monitoring result.

17. A computer implemented method of monitoring a condition prevailing inside a piping system including at least one pipe with respect to an impairment due to accretion, abrasion or corrosion caused by one or more fluid(s) flowing through the piping system; the method comprising the steps of:

installing at least two measurement devices on the piping system; wherein each measurement device is of a different type, is susceptible to an impairment corresponding to the impairment of the condition prevailing inside the piping system and is configured to measure one or more variables indicative of the impairment; and wherein the variables measured by the different measurement devices include at least two variables each exhibiting a different dependency on the impairment;

during operation of the piping system continuously recording data including time series of measured values of the variables measured by the measurement devices and their time of measurement;

based on training data included in the data determining a dynamic reference behavior of the variables corresponding to time dependent distributions of values of the variables to be expected of the measured values when the measurement devices are unimpaired;

wherein the dynamic reference behavior is determined such, that it reflects the values and the time dependencies of the variables and their interdependencies;

repeatedly determining a deviation between a monitored behavior corresponding to time dependent distributions of the measured values of the variables determined based on the data recorded during monitoring and the reference behavior;

wherein the monitored behaviors are determined such, that they reflect the values and the time dependencies of the variables and their interdependencies; and based on the deviations at least once or repeatedly determining and providing a monitoring result by performing at least one of:

a) detecting an impaired condition, when the deviations exceed a first deviation range and providing an output informing about the impaired condition, and b) determining a remaining time remaining until a degree of the impairment of the condition prevailing inside the piping system will exceed a predetermined limit by performing a time series prediction predicting a time remaining until the deviations will exceed a second deviation range corresponding to the predetermined limit and providing an output informing about the remaining time given by or corresponding to the time predicted by the time series prediction;

at least once or repeatedly performing the steps of:

for at least two or each of the variables based on the measured values of the respective variable included in the data recorded during monitoring or filtered data attained by filtering the data recorded during monitoring performing a time series prediction predicting a variable-specific remaining time remaining until the measured values of the respective variable will exceed a predetermined variable-specific range;

determining the shortest one of the variable-specific remaining times as a minimum time remaining until the degree of impairment of the condition prevailing inside the piping will exceed the predetermined limit; and performing at least one of:

providing an output informing about the minimum time, the variable for which the shortest one of the variable-specific remaining times was determined and/or the measurement device measuring the variable for which the shortest one of the variable-specific remaining times was determined;

based on the minimum time performing a plausibility check of the remaining time determined based on the deviations; and issuing a warning when a difference between the remaining time and the minimum time exceeds a predetermined threshold.

* * * * *